United States Patent
Dong et al.

(10) Patent No.: US 7,709,043 B2
(45) Date of Patent: May 4, 2010

(54) METHOD OF PREPARING PROCESSED ROOT VEGETABLES OR FRUIT VEGETABLES

(75) Inventors: Myong Gon Dong, Goyang (KR); Hee Soon Cheon, Seoul (KR); Jun Bong Choi, Seoul (KR)

(73) Assignee: CJ Cheiljedang Corporation, Seoul (KR)

(*) Notice: Subject to any disclaimer, the term of this patent is extended or adjusted under 35 U.S.C. 154(b) by 923 days.

(21) Appl. No.: 11/457,939

(22) Filed: Jul. 17, 2006

(65) Prior Publication Data

US 2007/0020374 A1     Jan. 25, 2007

(30) Foreign Application Priority Data

Jul. 19, 2005     (KR) ...................... 10-2005-0065434

(51) Int. Cl.
 *A23B 7/08* (2006.01)
(52) U.S. Cl. ................. 426/639; 426/104; 426/442; 426/512; 426/640
(58) Field of Classification Search ............. 426/104, 426/639, 442, 640
 See application file for complete search history.

(56) References Cited

U.S. PATENT DOCUMENTS 4,650,683 A * 3/1987 Guittard et al. ............. 426/103
5,264,238 A * 11/1993 Taga et al. ................. 426/640
6,146,683 A * 11/2000 Scharf ....................... 426/638
6,379,729 B1 * 4/2002 Onishi et al. ............... 426/250

FOREIGN PATENT DOCUMENTS

| CN | 1631232 A | | 6/2005 |
| EP | 1123657 A1 | * | 8/2001 |
| JP | 2000166480 A | * | 6/2000 |
| JP | 2003-070440 A | | 3/2003 |
| JP | 2005137219 A | * | 6/2005 |

OTHER PUBLICATIONS

S. Singh et al. Osmotic concentration kinetics and quality carrot preserve. (1999). Food Research International, 32, p. 509-514.*
Ling, X., "The Deep-Processing technique for Tomato," Development of Agricultural and Livestock Products, second period of 2001, p. 3.

* cited by examiner

*Primary Examiner*—Jennifer McNeil
*Assistant Examiner*—Dominique Womack
(74) *Attorney, Agent, or Firm*—Rothwell, Figg, Ernst & Manbeck, pc

(57) ABSTRACT

Provided is a method of preparing processed root vegetables or fruit vegetables including: a) heat-treating vegetables selected from the group consisting of root vegetables and fruit vegetables; b) immersing the heat-treated vegetables in a sugar solution; c) preparing a paste of the heat-treated vegetables that are immersed in the sugar solution; d) shaping the paste into the original shape of the vegetables; e) spreading or coating a material having a similar color to the peel color of the original vegetables onto the surface of the shaped paste; and f) drying the spread or coated shaped paste.

12 Claims, 1 Drawing Sheet

METHOD OF PREPARING PROCESSED ROOT VEGETABLES OR FRUIT VEGETABLES

CROSS-REFERENCE TO RELATED PATENT APPLICATION

This application claims the benefit of Korean Patent Application No. 10-2005-0065434, filed on Jul. 19, 2005, in the Korean Intellectual Property Office, the disclosure of which is incorporated herein in its entirety by reference.

BACKGROUND OF THE INVENTION

1. Field of the Invention

The present invention relates to a method of preparing processed root vegetables or fruit vegetables, and more particularly, to a method of preparing processed root vegetables or fruit vegetables using paste of the root vegetables or fruit vegetables as a main ingredient.

2. Description of the Related Art

Vegetables can be classified into three categories according to edible parts thereof; namely: leafy vegetables, root vegetables and fruit vegetables. Examples of leafy vegetables include vegetables such as Chinese cabbage, cabbage, lettuce, and spinach, leaves of which are edible, vegetables such as onion and garlic, leaves of which are transformed into a reserve organ, vegetables such as cauliflower, flower buds of which are edible, and vegetables such as asparagus and bamboo sprouts, young stems of which are edible. Examples of root vegetables include taproot vegetables such as radish, turnip, carrot and burdock, taproots of which are edible, tuberous root vegetables such as sweet potato and yam, tuberous roots of which are edible, and rhizome vegetables such as lotus root, potato, and ginger, rhizomes of which are edible. Examples of fruit vegetables, fruits of which are the reproductive organs thereof and are edible, include cucurbitaceous vegetables such as cucumber, pumpkin, and melon, nightshade vegetables such as pepper, tomato and eggplant, leguminous vegetables such as pea, and kidney bean, and other vegetables such as strawberry and corn.

Vegetables can be eaten in their natural state, and can also be processed and packed using various methods to preserve them and to provide a new flavor. Methods of processing vegetables such as frying vegetables, preserving vegetables with salt or sugar, drying vegetables, and keeping vegetables in a freezer or a refrigerator have been used to improve storage properties. The vegetables can be preserved in their original shape or cut into small pieces for convenience of packing.

However, conventional food processing methods, while providing improved storage properties, an efficient manufacturing process, and retention of original taste and shape, do not provide these properties simultaneously.

SUMMARY OF THE INVENTION

The present invention provides a method of preparing miniaturized processed root vegetables or fruit vegetables that retain the same or similar taste and shape as those of the original vegetables.

According to an aspect of the present invention, there is provided a method of preparing processed root vegetables or fruit vegetables including: a) heat-treating vegetables selected from the group consisting of root vegetables and fruit vegetables; b) immersing the heat-treated vegetables in a sugar solution; c) preparing a paste of the heat-treated vegetables that are immersed in the sugar solution; d) shaping the paste into the original shape of the vegetables; e) spreading or coating a material having a similar color to the peel color of the original vegetables onto the surface of the shaped paste; and f) drying the spread or coated shaped paste.

The root vegetables may be sweet potatoes, potatoes, or carrots.

The fruit vegetables may be pumpkins, or peppers.

The heat-treatment in operation a) may be performed in water at a temperature of 90 to 100° C. for 10 to 40 minutes.

The sugar solution in operation b) may be prepared by dissolving powdered sugar or white sugar in water in a concentration of 10 to 40 Brix.

The immersing of the heat-treated vegetables in the sugar solution in operation b) is performed at a temperature of 90 to 100° C. for 10 to 30 minutes.

A sugar concentration of the paste after operation b) may be 10 to 30 Brix.

The method may further include regulating the moisture content of the paste to 30 to 50% by weight after operation c).

The length of the shaped paste in operation d) is in the range of 0.5 to 8 cm.

When the vegetable is sweet potatoes, the material having a similar color to the peel color of the original vegetables in operation e) may be a mixture of purple sweet potato powder and red bean powder in a weight ratio of 1:100 or less. Alternatively, the material having a similar color to the peel color of the original vegetable in operation e) may be a solution prepared by dissolving a mixture of purple sweet potato powder and red bean powder in a weight ratio of 1:100 or less in water. In addition, the material having a similar color to the peel color of the original vegetables in operation e) may also be a concentrated liquid prepared by dissolving carrageenan in water by heating, adding purple sweet potato powder and red bean powder therein, and stirring the mixture to a thick state.

The method may further include packing and retorting the product after operation f).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
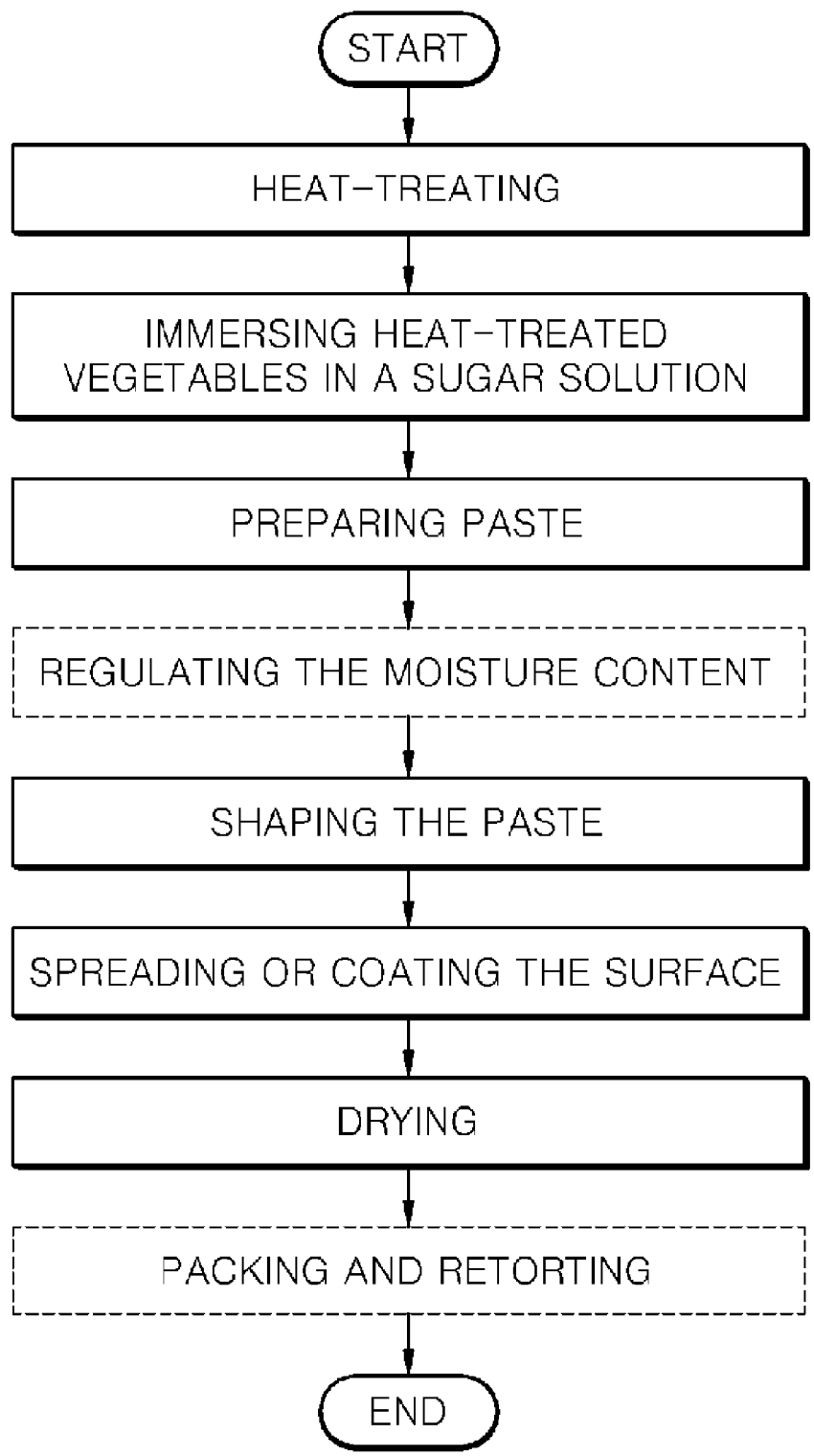
FIG. 1 is a flowchart briefly illustrating a method of preparing processed root vegetables or fruit vegetables.

Hereinafter, the present invention will now be described more fully with reference to the accompanying drawing, in which an exemplary embodiment of the invention is shown.

FIG. 1 is a flowchart briefly illustrating a method of preparing processed root vegetables or fruit vegetables.

In FIG. 1, operations illustrated in a solid line box are essential operations, and operations illustrated in a dotted line box are optional operations according to an embodiment of the present invention.

Heat-Treating

To prepare processed root vegetables or fruit vegetables according to an embodiment of the present invention, vegetables selected from the group consisting of root vegetables and fruit vegetables are heat-treated and immersed in a sugar solution.

The root vegetables may be sweet potatoes, potatoes, or carrots, but are not limited thereto.

The fruit vegetables may be pumpkins, or peppers, but are not limited thereto.

Any species of root vegetable or fruit vegetable may be used and the areas of origin of the root vegetables and the fruit vegetables are not limited.

In particular, the vegetables are peeled, and then heat-treated to soften tissues of the vegetables. In the heat-treatment, the whole vegetables may be heat-treated, or the vegetables may be cut into small pieces to increase the surface area.

The heat-treatment may be performed in water at a temperature of 90 to 100° C. for 10 to 40 minutes. The temperature of the heat-treatment and the heating time may be regulated within these ranges according to the type of vegetables and according to preference.

Immersing Heat-Treated Vegetables in a Sugar Solution

The paste obtained from the heat-treated vegetables has a weak setting ability so that shaping the paste is not easily performed. Thus, the heat-treated vegetables are immersed in a sugar solution and then the paste can be easily set.

The sugar solution may be prepared by dissolving sugar in water in a concentration of 10 to 40 Brix. When the sugar concentration is less than 10 Brix, the paste takes a longer time to set. When the sugar concentration is greater than 40 Brix, the viscosity of the sugar solution is too high and the setting efficiency may decrease. The sugar may be monosaccharide, polysaccharide, or sugaralcohol, more preferably, glucose, xylose, galactose, fructose, D-mannose, sorbose, lactose, maltose, trehalose, sucrose, mannitol, sorbitol, xylitol, glycerin, glycerol, erythritol, arabitol, malto-oligosaccharide or isomalto-oligosaccharide, and most preferably trehalose, malto-oligosaccharide, isomalto-oligosaccharide or sugaralcohol. Preferably, the sugar may be powdered sugar or white sugar. The powdered sugar as used herein refers to sugar pulverized into fine particles.

The heat-treated vegetables may be immersed in the sugar solution at a temperature of 90 to 100° C. for 10 to 30 minutes. The sugar concentration of the paste can be properly regulated by regulating the immersing temperature and time.

The sugar concentration of the paste after immersing the heat-treated vegetables may be 10 to 30 Brix. When the sugar concentration of the paste is less than 10 Brix, the paste cannot be easily shaped. When the sugar concentration of the paste is greater than 30 Brix, the product tastes too sweet and the texture of the product is too tough.

Preparing the Paste

Next, the paste of the heat-treated vegetables is prepared. The paste may be prepared by mashing or grinding the heat-treated vegetables. An extruding machine or a mixer can be used to prepare the paste.

Regulating the Moisture Content of the Paste

The paste cannot be easily shaped only by immersing the vegetables in a sugar solution depending on the types of the vegetables. Herein, examples of the vegetables may include sweet potatoes, pumpkins, potatoes, and carrots.

Accordingly, the method may further include regulating the moisture content of the paste to 30 to 50% by weight.

In general, the moisture content is rather high in the paste prepared above, and thus the moisture content may be regulated by drying the paste. The drying the paste may be performed using a conventional drying method such as natural drying or hot air drying. In particular, a drying device such as an oven or a drying machine may be used.

When the moisture content of the paste is less than 30% by weight, the paste is too thick to be properly shaped. When the moisture content of the paste is greater than 50% by weight, the paste is too soft to be properly shaped.

Shaping the Paste

The paste of which the sugar concentration and the moisture content are regulated is shaped into the original shape of the vegetables.

For example, when the vegetables used are sweet potatoes, the paste is shaped into a sweet potato shape, and when the vegetables are pumpkins, the paste is shaped into a pumpkin shape.

The shaping of the paste may be performed using a conventional method of shaping, and preferably a prepared mold can be used to shape the paste.

The length of the shaped paste may be in the range of 0.5 to 8 cm, and more preferably in the range of 1 to 3 cm which is a mouth-sized piece.

Spreading or Coating the Surface

A vegetable powder having a similar color to the peel color of the original vegetable may be spread onto the surface of the shaped paste, or a solution of vegetable having a similar color to the peel color of the original vegetable may be coated onto the surface of the shaped paste.

In the first method of forming an outer cover of the shaped paste, a vegetable powder having a similar color to the peel color of the original vegetable may be spread onto the surface of the shaped paste.

For example, in the case of a sweet potato, the vegetable powder that is spread onto the surface of the shaped paste may be purple sweet potato powder, and thus the processed product can have the same taste as sweet potato. A purple sweet potato indicates a sweet potato colored purple after being peeled. The purple sweet potato powder may be prepared using a conventional method. For example, the sweet potato powder may be prepared by being cut, gelatinized, and dried using hot air.

A mixture of purple sweet potato powder and red bean powder may be spread on the surface of the shaped paste to color the processed food the same color as the sweet potato. Here, the weight ratio of the purple sweet potato powder and red bean powder may be 1:100 or less. When the weight ratio is greater than 1:100, the taste of the processed food is not the same as that of the original vegetable.

In addition, in the case of a pumpkin, the vegetable powder that is spread onto the surface of the shaped paste may be green pumpkin powder, and artemisia powder or spinach powder may further be included in the green pumpkin powder. Here, the weight ratio of the green pumpkin powder and artemisia powder or spinach powder may be 1:100 or less because of the reason described above.

In the second method of forming an outer cover of the shaped paste, a solution including the vegetable powder prepared above may be coated onto the surface of the shaped pasted. The solution can be prepared by dissolving at least one powder described above in water. The weight ratio of the powder and water may be 16:80~84 for efficiency.

In the third method of forming an outer cover of the shaped paste, a jelly or sweet jelly producing method may be used. That is, a powder is liquefied using a gelling agent, the liquefied powder is coated onto the shaped paste, and the liquefied powder is solidified to form an outer cover.

For example, in the case of a sweet potato, carrageenan is dissolved in water by heating, purple sweet potato powder and red bean powder are added thereto, and the mixture is stirred to a thick state to obtain a concentrated liquid. Then the concentrated liquid is coated onto the surface of the shaped paste.

In addition, for example, in the case of a green pumpkin, agar is dissolved in water by heating, green pumpkin powder is added thereto, and the mixture is stirred to a thick state to obtain a concentrated liquid. The concentrated liquid is coated onto the surface of the shaped paste.

The spreading of the powder or coating of the solution including powder may be performed using a conventional method. For example, the shaped pasted may be dipped in the powder or the solution.

Drying

The spread or coated shaped paste is dried to form a stable bond between the shaped paste and the spread vegetable powder.

Any conventional drying method such as natural drying or hot air drying may be used to dry the spread or coated shaped paste. In particular, a drying device such as an oven or a drying machine may be used. When an oven is used, the spread or coated shaped paste may be dried at a temperature of 100 to 200° C. for 10 to 20 minutes.

Packing and Retorting

The prepared processed food may be packed and retorted for distribution of the processed product.

For example, the prepared processed food may be packed in an aluminium pouch filled with nitrogen gas and/or a deoxidant.

The packed processed food is retorted. For example, the packed processed food may be retorted at a temperature of 115 to 125° C.

Hereinafter, the present invention will be described more specifically with reference to the following examples. The following examples are for illustrative purposes and are not intended to limit the scope of the invention.

Example 1

Preparing Processed Sweet Potato

Sweet potato was peeled, and cut into same pieces. The cut sweet potato was immersed in boiling water at a temperature of 100° C. and heated for 10 minutes. The heat-treated sweet potato was immersed in a sugar solution having a concentration of 25 Brix for 30 minutes, thus producing a paste. Then the sugar concentration of the paste was measured to be 28 Brix.

The paste of the sweet potato was shaped like a sweet potato, that is, in an oval shape having a lengthwise dimension of 5.2 cm.

A mixture of purple sweet potato powder and red bean powder in a weight ratio of 1:0.1 was evenly spread onto the surface of the shaped paste, and the spread shaped paste was dried in an oven at a temperature of 180° C. for 10 minutes to prepare processed sweet potato.

The dried product was put into an aluminium pouch, the pouch was filled with nitrogen gas, retorted at 120° C., and stored.

Example 2

Preparing Processed Sweet Potato

Processed sweet potato was prepared in the same manner as in Example 1, except that a concentrated liquid prepared by dissolving carrageenan in water by heating, adding purple sweet potato powder and red bean powder thereto, and stirring the mixture to a thick state was spread on the surface of the shaped paste instead of the mixture of purple sweet potato powder and red bean powder.

Example 3

Preparing Processed

Processed pumpkin was prepared in the same manner as in Example 1, except that pumpkin was used instead of sweet potato, and pumpkin powder was spread on the surface of the shaped paste instead of the mixture of purple sweet potato powder and red bean powder.

The processed food according to the present invention is suitable for a mouth-sized serving by miniaturizing root vegetables and fruit vegetables, has almost the same taste, shape, and color as the original vegetable, and thus the processed food can visually appeal to consumers. In addition, packing and distribution of the processed food can be more convenient, and the processed food can be easily manufactured by uniformly regulating the size of the product. Manufacturing is possible regardless of the season, and distribution of the product can be possible at room temperature by regulating the moisture content and sugar concentration of the product.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing processed root vegetables or fruit vegetables, comprising:
   a) heat-treating vegetables selected from the group consisting of root vegetables and fruit vegetables;
   b) immersing the heat-treated vegetables in a sugar solution, wherein the sugar concentration of the sugar solution is 10 to 40 Brix;
   c) preparing a paste of the heat-treated vegetables that are immersed in the sugar solution;
   d) shaping the paste into the original shape of the vegetables, wherein the sugar concentration of the paste after operation c) is 10 to 30 Brix;
   e) spreading or coating a material having a similar color to the peel color of the original vegetables onto the surface of the shaped paste; and
   f) drying the spread or coated shaped paste.

2. The method of claim 1, wherein the root vegetables are selected from the group consisting of sweet potatoes, potatoes, and carrots.

3. The method of claim 1, wherein the fruit vegetables are selected from the group consisting of pumpkins and peppers.

4. The method of claim 1, wherein the heat-treatment in operation a) is performed in water at a temperature of 90 to 100° C. for 10 to 40 minutes.

5. The method of claim 1, wherein the sugar solution in operation b) is prepared by dissolving powdered sugar or white sugar in water in a concentration of 10 to 40 Brix.

6. The method of claim 1, wherein the immersing of the heat-treated vegetables in the sugar solution in operation b) is performed at a temperature of 90 to 100° C. for 10 to 30 minutes.

7. The method of claim 1, further comprising regulating the moisture content of the vegetables to 30 to 50% by weight after operation c).

8. The method of claim 1, wherein the length of the shaped paste in operation d) is in the range of 0.5 to 8 cm.

9. The method of claim 1, wherein the vegetables are sweet potatoes and the material having a similar color to the peel color of the original vegetables in operation e) is a mixture of purple sweet potato powder and red bean powder in a weight ratio of 1:100 or less.

10. The method of claim 1, wherein the vegetables are sweet potatoes and the material having a similar color to the peel color of the original vegetable in operation e) is a solution prepared by dissolving a mixture of purple sweet potato powder and red bean powder in a weight ratio of 1:100 or less in water.

11. The method of claim 1, wherein the vegetables are sweet potatoes and the material having a similar color to the peel color of the original vegetables in operation e) is a concentrated liquid prepared by dissolving carrageenan in water by heating, adding purple sweet potato powder and red bean powder thereto, and stirring the mixture to a thick state.

12. The method of claim 1, further comprising packing and retorting the dried spread or coated shaped paste after operation f).

* * * * *